US007299344B2

(12) United States Patent
Oomori

(10) Patent No.: US 7,299,344 B2
(45) Date of Patent: Nov. 20, 2007

(54) SETUP SUPPORT SYSTEM, PHYSICAL ACCESS DRIVER, AND SETUP SUPPORT METHOD

(75) Inventor: Mikio Oomori, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 467 days.

(21) Appl. No.: 10/814,299

(22) Filed: Apr. 1, 2004

(65) Prior Publication Data
US 2004/0268110 A1 Dec. 30, 2004

(30) Foreign Application Priority Data
Jun. 30, 2003 (JP) ............... 2003-188498

(51) Int. Cl.
*G06F 15/177* (2006.01)
(52) U.S. Cl. ........................................... 713/1
(58) Field of Classification Search .............. 713/1
See application file for complete search history.

(56) References Cited
U.S. PATENT DOCUMENTS
5,913,058 A * 6/1999 Bonola ..................... 713/2

5,978,590 A * 11/1999 Imai et al. ................. 717/177
6,098,119 A * 8/2000 Surugucchi et al. .......... 710/10
6,996,743 B2* 2/2006 Knapp, III .................. 714/6
2002/0101711 A1* 8/2002 Gold ......................... 361/685
2004/0019822 A1* 1/2004 Knapp, III .................. 714/6

FOREIGN PATENT DOCUMENTS
JP 5-289855 11/1993

* cited by examiner

*Primary Examiner*—Rehana Perveen
*Assistant Examiner*—Fahmida Rahman
(74) *Attorney, Agent, or Firm*—Finnegan, Henderson, Farabow, Garrett & Dunner, L.L.P.

(57) ABSTRACT

A physical access driver provides, to a setup support utility, a function of invoking a physical access routine prepared in a basic input/output system (BIOS) to access physically an hard disk drive (HDD). The setup support utility executes setup including installation of an operating system while storing, in the HDD as the installation destination, information for initialization of the HDD, information for setting of the operating system, and setup progress information by using the physical access driver.

1 Claim, 7 Drawing Sheets

Main menu

Main menu
Setup support system is a tool for simplifying complexity for server hardware setting to OS installation.

Setup:
You can construct RAID in hard disks and install OS in series of processes. Simple setting with simplified and automated operations is available.

Utility:
Utility includes auxiliary function for manual installation and setup information setting function which allows administrators to define setup contents in advance.

Document:
You can open folders containing document files.

[Details]

Main menu

Setup:
Start server setup wizard
a1

Utility:
Individually activate tools for server setup and maintenance

Document:
Display document files

[End]

FIG. 3

Simple RAID configuration

Input type of RAID configuration and number of hard disks to be used for RAID configuration.

In simple RAID configuration, one array group is formed.

Details

1/n windows are set

Simple RAID setting

Select type of RAID
a2
● RAID 0  (1 to 5 HDDs are usable)
○ RAID 1  (2 HDDs are used)
○ RAID 5  (3 to 5 HDDs are usable)

Allocate HDDs
Settable number of HDDs  a3 MAX ▷
Set number of HDDs a5 <Back   a4 Next>   a6 Main menu 0   50   100

FIG. 4

User information
Input your name, name of company, name of section to which you belong, CD key or product ID of Xxxxxx Server 2003, and computer name of server.

Following symbols cannot be used in computer name
?"/◇*|:¥;[];+=,.
"(double quotation mark) cannot be used in any items.

Details

3/n windows are set

User information setting

User name :
Organization name :
Product ID/CD key :
Computer name :

a8

<Back  Next>  a4

Main menu 0   50   100

FIG. 6

SETUP SUPPORT SYSTEM, PHYSICAL ACCESS DRIVER, AND SETUP SUPPORT METHOD

CROSS-REFERENCE TO RELATED APPLICATIONS

This application is based upon and claims the benefit of priority from prior Japanese Patent Application No. 2003-188498, filed Jun. 30, 2003, the entire contents of which are incorporated herein by reference.

BACKGROUND OF THE INVENTION

1. Field of the Invention

The present invention relates to a setup support system and setup support method, which can suitably be applied to, e.g., a server computer that constructs a RAID configuration by using a plurality of hard disk drives.

2. Description of the Related Art

Recent penetration of computers to offices and households is remarkable. Computers of this type requires setup including, e.g., installation of an operating system. This operation is cumbersome. Recently, standard setup is executed in advance before shipment from the manufacturer or selling agency, or a software installation support tool is packed together.

For example, an installation module described in Jpn. Pat. Appln. KOKAI Publication No. 5-289855 allows to install a basic OS only by power-ON.

A computer used as a server in an office often constructs a RAID configuration by using a plurality of hard disk drives instead of using a single hard disk drive, thereby increasing the fault tolerance. In this case, the operating system is installed in a hard disk drive after constructing the RAID configuration. On the other hand, the above-described installation module described in Japanese Patent Application No. 4-93214 has no consideration about initialization of the storage medium as the installation destination, i.e., construction of the RAID configuration at all.

For these reasons, installation support tools have recently been provided, which support, before installation of an operating system, construction of a RAID configuration or setting of a partition where the operating system should be installed. These tools are normally stored in a storage medium such as an optical disk and distributed.

For an installation support tool which supports computer setup including installation of an operating system to be installed in a storage medium that requires initialization, as in construction of a RAID configuration, not only the storage medium and a storage medium that stores the installation support tool but also a storage medium such as a floppy disk (R) that requires no initialization is essential. The reason for this is as follows. Until initialization is ended, no data can be written/read in/from the storage medium as the installation destination. On the other hand, setting parameters representing the contents of various configuration setup designated by the user or status data representing the situation of progress must be stored in a storage medium before and during initialization.

However, when the third storage medium is essential, the cost increases, resulting disadvantages for both the user and the manufacturer or selling agency.

To omit the third storage medium, the user may execute input for various kinds of setup in two steps, i.e., before and after initialization of the storage medium as the installation destination of the operating system. With these procedures, any situation that requires storage of setting parameters and status data in the storage medium before and during initialization can be avoided.

However, this method cannot meet the user requirement that all necessary input operations should be ended at once, e.g., at the start, and forces the user to waste time.

BRIEF SUMMARY OF THE INVENTION

According to an embodiment of the present invention, a setup support system which supports setup of a computer, including installation of an operating system to be installed in a storage medium that requires initialization, comprises a physical access unit configured to execute physical access to the storage medium without intervening the operating system, an interface unit configured to execute input operations for configuration setup of the computer, including initialization of the storage medium, at once, a setting parameter management unit configured to store setting parameters representing input setting contents in the storage medium before initialization by using the physical access unit, a medium setting unit configured to initialize the storage medium after storage of the setting parameters by the setting parameter management unit, and a setup unit configured to read out the setting parameters stored in the storage medium by using the physical access unit after initialization of the storage medium by the medium setting unit, and execute setup of the computer, including installation of the operating system, based on the setting parameters.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a view showing a main menu window displayed by the setup support system according to the embodiment;

FIG. 4 is a view showing a RAID setting window displayed by the setup support system according to the embodiment;

FIG. 6 is a view showing a user information setting window displayed by the setup support system according to the embodiment.

DETAILED DESCRIPTION OF THE INVENTION

The embodiment of the present invention will be described below with reference to the accompanying drawing.

Figure 1:
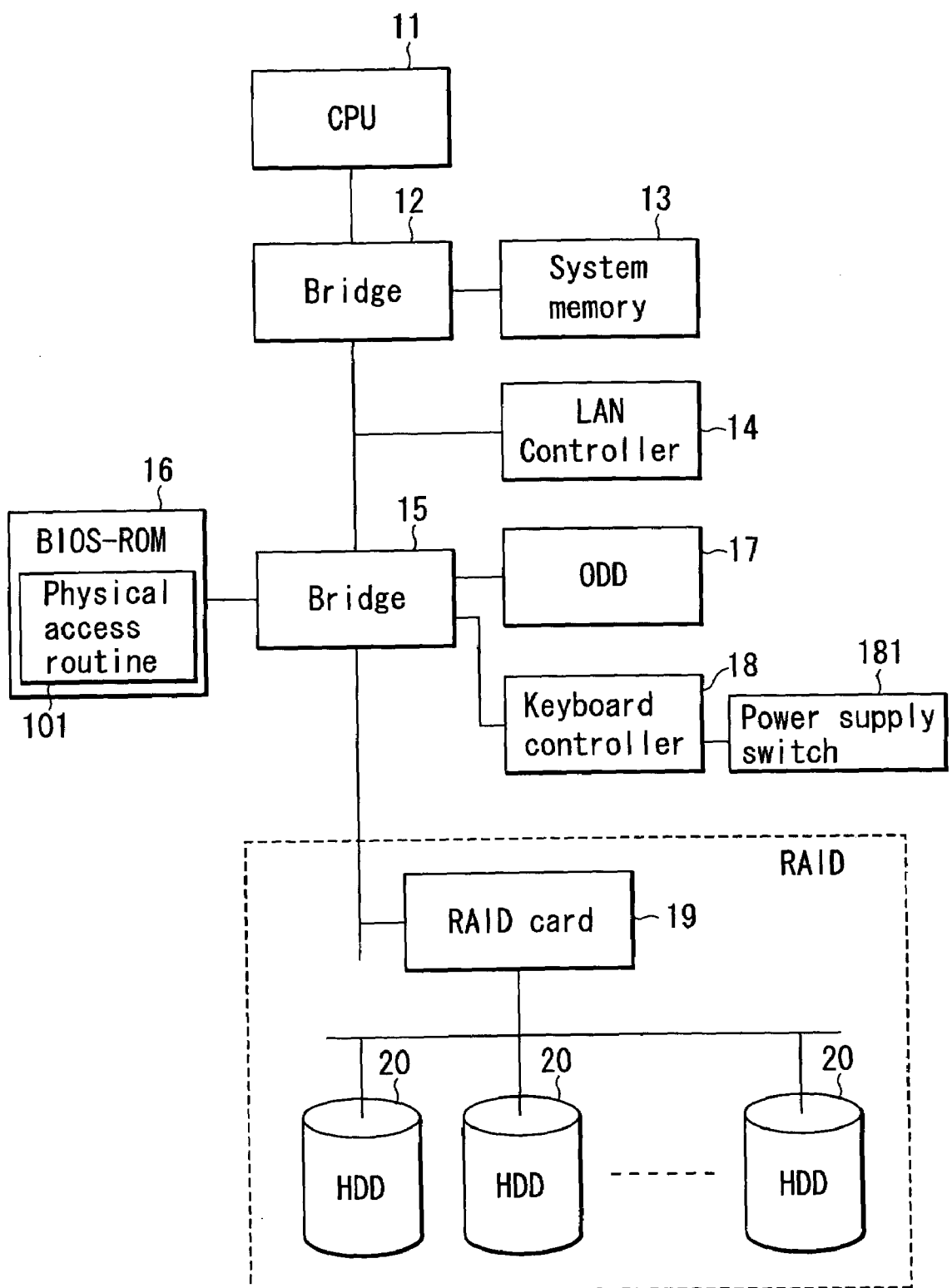
FIG. 1 is a block diagram showing the hardware configuration of a computer to which a setup support system according to the embodiment of the present invention is applied.

FIG. 1 is a block diagram showing the hardware configuration of a computer to which a setup support system according to the embodiment of the present invention is applied.

This computer is a high-end computer used as a server in an office. As shown in FIG. 1, the computer comprises a CPU 11, a bridge 12, a system memory 13, a local area network (LAN) controller 14, a bridge 15, a basic input/output system (BIOS)-ROM 16, an optical disk drive (ODD) 17, a keyboard controller 18, a RAID card 19, and a plurality of hard disk drives (HDDs) 20.

The CPU 11 controls the whole system and executes various kinds of programs including an operating system and utilities stored in the system memory 13 or a BIOS stored in the BIOS-ROM 16. The bridge 12 connects the CPU bus and system bus as its primary function. The bridge 12 also has a function of a control device called a memory controller or graphic controller and executes access control for the system memory 13 or image display control for an externally connected display device. The system memory 13 is a storage medium serving as the main memory of the system. The system memory 13 temporarily stores various kinds of programs to be executed by the CPU 11 and their data.

The LAN controller 14 is connected to the system bus that is connected to the CPU bus through the bridge 12. The LAN controller 14 executes data communication with a plurality of client computers scattered in the office through a network constructed by, e.g., an Ethernet (R) system.

The bridge 15 has, as its main function, a function of connecting the system bus to various I/O devices. The BIOS-ROM 16, the ODD 17, and the keyboard controller 18 are connected to the bridge 15. The BIOS-ROM 16 stores a BIOS to drive and control, by software, various kinds of hardware incorporated in the system. The BIOS stored in the BIOS-ROM 16 has a physical access routine 101 (to be described later).

The ODD 17 is a control device to read out a program or data stored in, e.g., an optical disk or hard disk or write a program or data in a hard disk. This setup support system or an operating system to be installed is loaded in the computer by the ODD 17.

When an externally connected keyboard or mouse or various buttons including a power supply switch 181 prepared on the housing surface are operated by the user, the keyboard controller 18 stores data representing the operation contents in an internal register. The keyboard controller 18 then generates an interrupt signal to cause the CPU 11 to refer to the internal register, thereby transmitting the operation contents to the CPU 11.

The RAID card 19 is a control device that can construct various RAID configurations such as RAID0, RAID1, or RAID5 by using the plurality of HDDs 20. The plurality of HDDs 20 that construct a RAID configuration under the control of the RAID card 19 store enormous quantities of programs and data as an external memory of the system, i.e., the auxiliary device of the system memory 13. The operating system of this computer is installed in the HDDs 20 that construct a RAID configuration. This setup support system can appropriately support computer setup including installation of the operating system without requiring any extra storage medium such as a floppy disk, except the ODD 17 used to read a program for a distributed optical disk and HDDs 20 which require construction of a RAID configuration and correspond to the installation destination of the program and also without forcing the user to waste time. This will be described below in detail.

Figure 2:
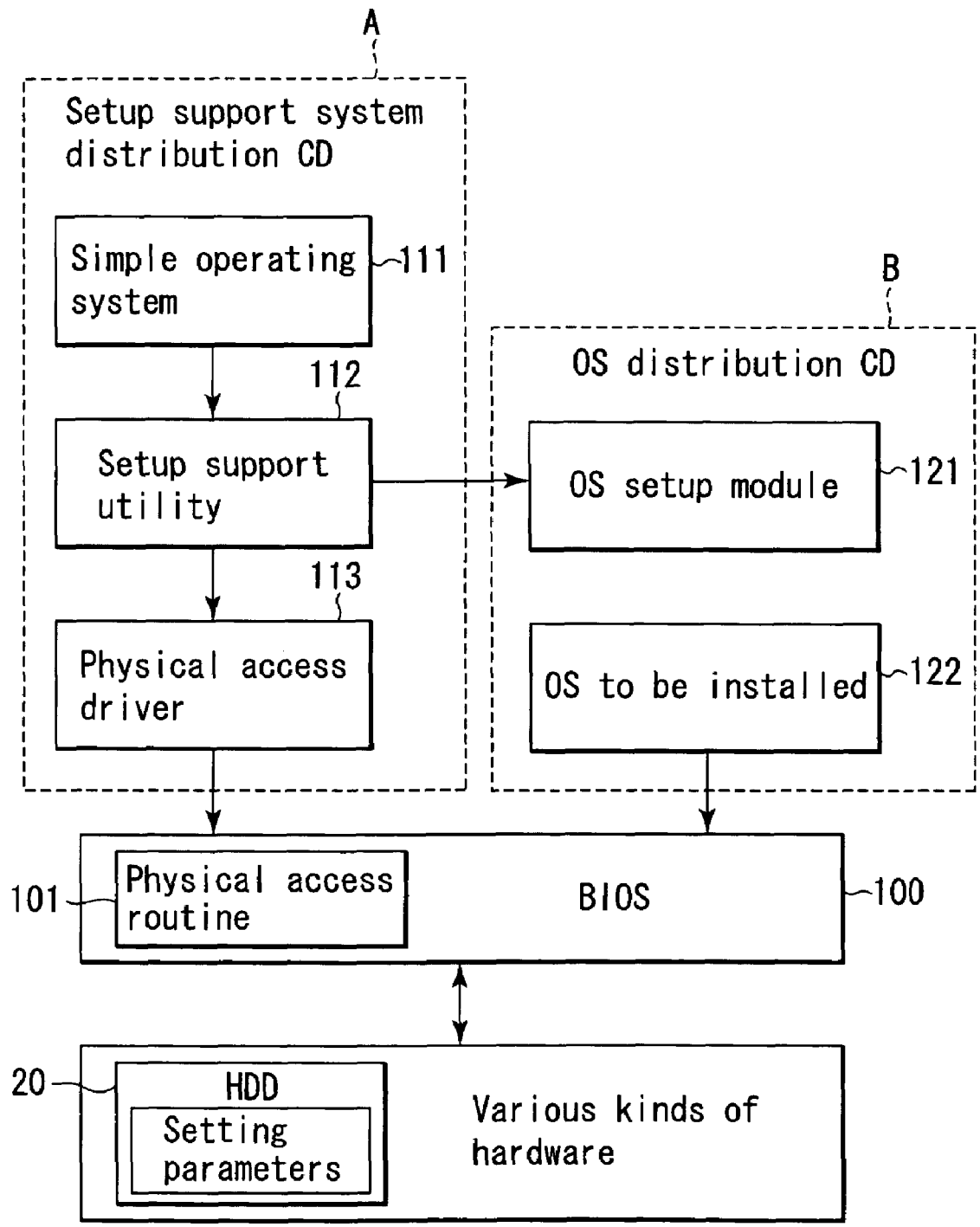
FIG. 2 is a block diagram showing a software configuration so as to explain the operation principle of setup support executed by the setup support system according to the embodiment.

FIG. 2 is a block diagram showing a software configuration so as to explain the operation principle of setup support executed by the setup support system according to this embodiment.

Assume that an optical disk A which stores the setup support system and an optical disk B which stores the operating system are packed together with the computer in shipping. Also, assume that the ODD 17 is set as the first device in the boot sequence by the BIOS function. This setup support system is constructed by two programs, i.e., a setup support utility 112 and physical access driver 113. These programs are stored in the optical disk A together with a simple operating system 111 that has minimum functions for executing and controlling the programs. On the other hand, the optical disk B stores an OS setup module 121 as an installation support tool of an operating system 122 to be installed.

Immediately after the power supply switch 181 is turned on, if the optical disk A is set in the ODD 17, the simple operating system 111 stored in the optical disk A is activated. In addition, the setup support utility 112 and physical access driver 113 are activated under the control of the simple operating system 111. The activated setup support utility 112 displays, e.g., a main menu window shown in FIG. 3.

When a setup icon a1 is selected by a mouse on the main menu window, the setup support utility 112 starts a setup operation for constructing a RAID configuration, generating a partition, or installing the operating system 122. The setup support utility 112 that has started the setup operation sequentially displays, e.g., windows for various kinds of configuration setup shown in FIGS. 4 to 6.

FIG. 4 shows a window on which the type of RAID configuration or the number of HDDs to be used for construction are selected. The user can select a desired configuration from three types, i.e., RAID0, RAID1, and RAID5 on the window. For example, when RAID0 should be constructed by using five HDDs 20, the user selects a radio button a2 by using the mouse. The user also selects the desired number of HDDs (since the settable number of HDDs is 5, "MAX" corresponds to 5) by a pull-down menu a3. When a button a4 is selected by the mouse, the setup support utility 112 determines that RAID setting on this window is ended and displays the window shown in FIG. 5. A button a5 on the left side of the button a4 or a button a6 on the right side is clicked to return the display to the preceding window and execute the operation again. When the button a5 is selected, the display can easily be returned to the immediately preceding window. When the button a6 is selected, the display can easily be returned to the first window. The functions of the buttons a4 to a6 are common to all subsequent windows.

Figure 5:
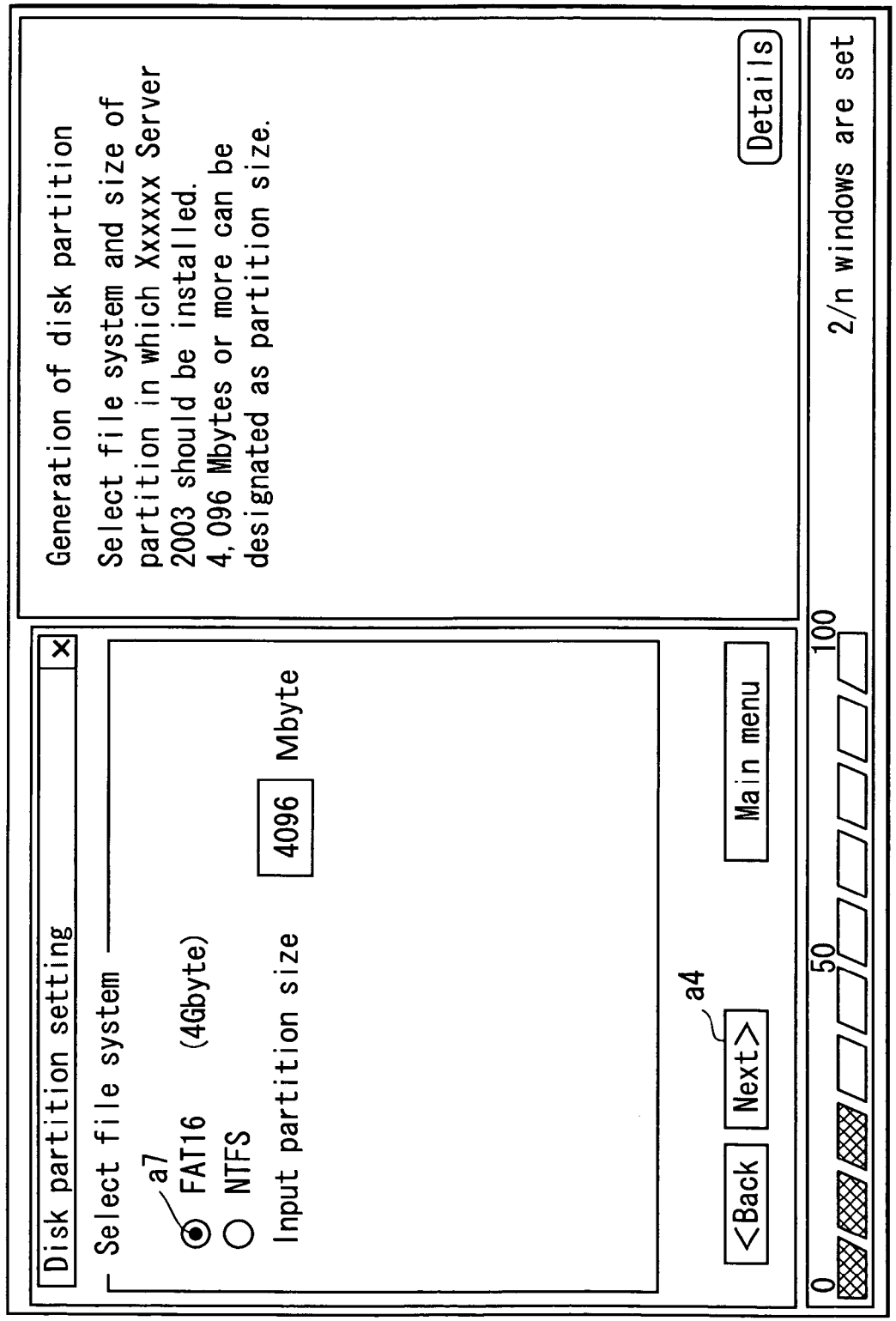
FIG. 5 is a view showing a disk partition setting window displayed by the setup support system according to the embodiment.

FIG. 5 shows a window on which a partition where the operating system is to be installed is set. The user can select the partition size and file system on this window. For example, to select the FAT16 file system, the user selects a radio button a7 by the mouse. When the FAT16 is selected, a partition size of 4,096 Mbytes is employed. The user need not input the partition size. When the button a4 is selected by the mouse, the setup support utility 112 determines that disk partition setting on the window shown in FIG. 5 is ended and displays the window shown in FIG. 6.

FIG. 6 shows a window on which pieces of so-called user information are set, including the name of the user, the name of the company, and the name of the section to which the user belongs. The user inputs each information to a corresponding text box a8 on this window by using the keyboard. When the button a4 is selected by the mouse, the setup support utility 112 determines that setting of the user information on the window shown in FIG. 6 is ended and displays the next window.

When the configuration setup on all windows including those shown in FIGS. 4 to 6 is ended, the setup support utility 112 writes setting parameters representing the setting contents to the HDD 20 by using the physical access driver 113. The physical access driver 113 has an interface to transmit/receive an instruction or data to/from the setup support utility 112. On the basis of an instruction received from the setup support utility 112 through the interface, the physical access driver 113 executes physical access to the HDD 20. That is, by using the physical access driver 113, the setup support utility 112 can write/read data in/from the HDD 20 before construction of the RAID configuration and generation of the disk partition, i.e., initialization is executed.

The physical access driver 113 is a program that executes physical access to the HDD 20 by invoking the physical access routine 101 in the BIOS 100. In the data write, the physical access driver 113 receives the identifier of the HDD 20, the write destination address, and the write data from the setup support utility 112 and invokes the physical access routine 101 by, e.g., the following format.

INTxx, hardware identifier, write destination address, write data

Then, the requested write is executed by the physical access routine 101. The physical access driver 113 notifies the setup support utility 112 that the data write is ended.

In the data read, the physical access driver 113 receives the identifier of the HDD 20, the read source address, and the data size from the setup support utility 112 and invokes the physical access routine 101 by, e.g., the following format.

INTxx, hardware identifier, read source address, data size

Then, data in the data size given as a parameter is returned from the physical access routine 101. The physical access driver 113 returns the data to the setup support utility 112.

By using the physical access driver 113, the setup support utility 112 writes the setting parameters representing the configuration setup contents in the HDD 20 before construction of the RAID configuration. Then, the setup support utility 112 constructs the RAID configuration on the basis of the setting parameters. In this case, a RAID0 configuration using five HDDs 20 is constructed. At this time, the setup support utility 112 writes status data representing that construction of the RAID configuration is progressing in the HDD 20 by using the physical access driver 113.

When construction of the RAID configuration is ended, the setup support utility 112 rewrites the status data in the HDD 20 by using the physical access driver 113 to indicate that construction of the RAID configuration is ended, and reboots the system. After the reboot, the setup support utility 112 executes a physical read of the setting parameters and status data by using the physical access driver 113. It can be seen from the readout status data that construction of the RAID configuration is ended. On the basis of the readout setting parameters, the setup support utility 112 generates the disk partition on the HDD 20 in which the RAID configuration is constructed. Even at this time, the setup support utility 112 writes status data representing that generation of the disk partition is progressing in the HDD 20 by using the physical access driver 113. When the generation is ended, the setup support utility 112 rewrites the status data by using the physical access driver 113 to indicate that generation of the disk partition is ended. In this example, the FAT16 file system is generated, and a partition in a size of 4,096 Mbytes is generated.

When construction of the RAID configuration and generation of the disk partition, i.e., initialization of the HDD 20 is ended, the setup support utility 112 writes the setting parameters and status data in the HDD 20 again as files under the simple operating system 111. When initialization is ended, access to the HDD 20 can be executed as file access under the simple operating system 111. The setup support utility 112 restores the setting parameters to data that is writable/readable by a normal program.

Next, the setup support utility 112 displays a window that prompts the user to set, in the ODD 17, the optical disk B that stores the operating system 122 to be installed, and the like. When the user sets the optical disk B in the ODD 17 in response to the window display, the OS setup module 121 is activated. The setup support utility 112 transfers, to the OS setup module 121, various kinds of setting information containing the user information represented by the setting parameters. On the basis of their contents, the OS setup module 121 installs the operating system 122. After that, the OS setup module 121 reboots the system to activate the operating system 122 installed in the HDD 20 instead of the simple operating system 111.

Figure 7:
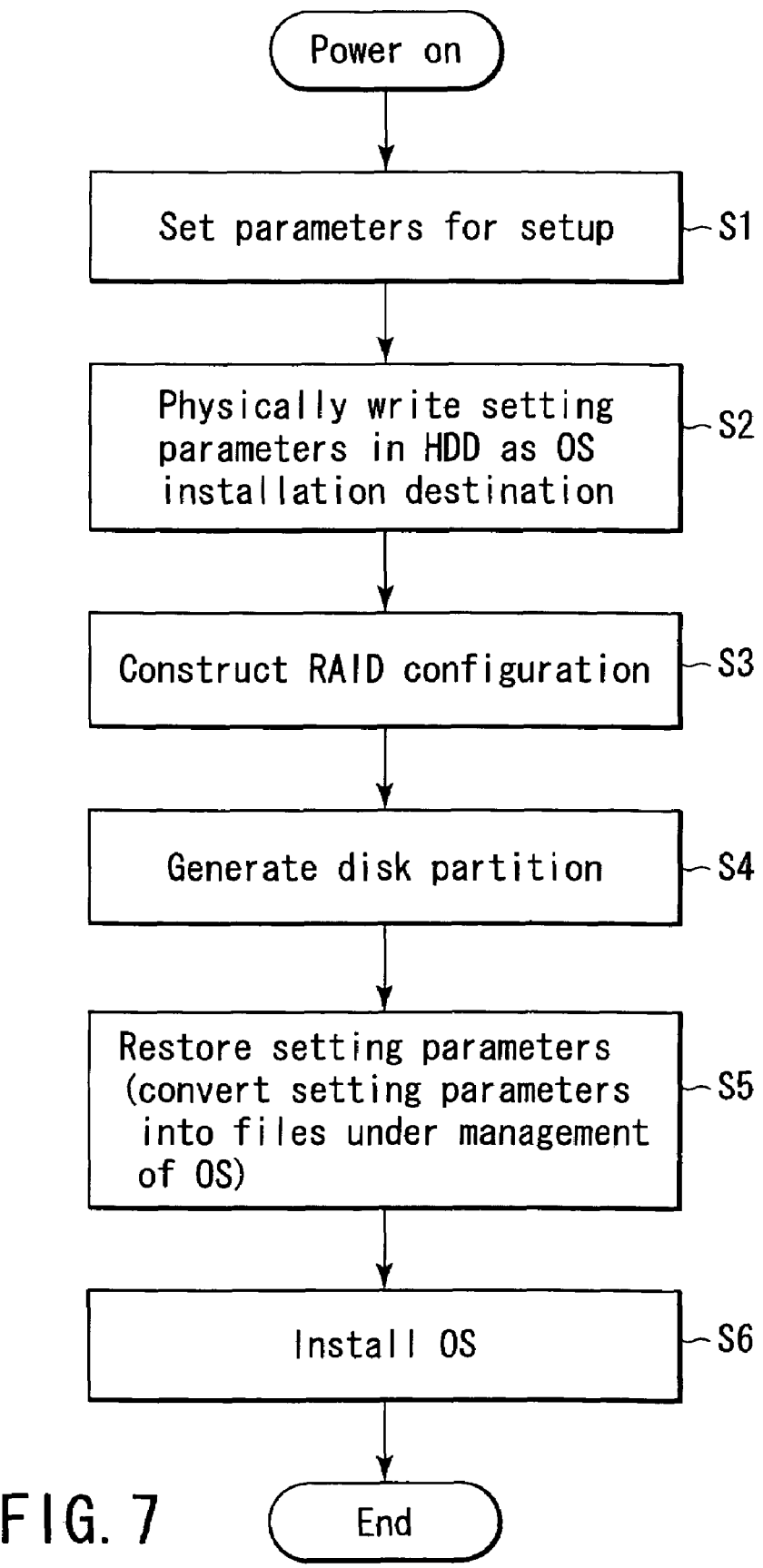
FIG. 7 is a flow chart showing the operation procedures of setup support executed by the setup support system according to the embodiment.

FIG. 7 is a flow chart showing the operation procedures of setup support executed by the setup support system.

First, the setup support utility 112 sequentially displays the windows for various kinds of configuration setup and acquires the setting parameters at once (step S1). The setup support utility 112 writes the acquired setting parameters in the HDD 20 before initialization, which is the installation destination of the operating system 122, by using the physical access driver 113 (step S2).

When this write is ended, the setup support utility 112 constructs the RAID configuration and generates the disk partition while accessing the setting parameters on the HDD 20 by using the physical access driver 113 (steps S3 and S4). When construction of the RAID configuration and generation of the disk partition, i.e., initialization of the HDD 20 is ended, the setup support utility 112 restores the setting parameters to files under the operating system (step S5).

When restoration of the setting parameters is ended, the setup support utility 112 prompts the user to set, in the ODD 17, the optical disk B which stores the OS setup module 121 and the operating system 122 to be installed. Various kinds of setting information are transferred to the thus activated OS setup module 121 so that the operating system 122 is installed (step S6).

As described above, this setup support system has the physical access driver 113 which executes physical access to the HDD 20 by invoking the physical access routine 101 in the BIOS 100. With this arrangement, the setup support system allows computer setup including installation of the operating system 122 without requiring any extra storage medium except the HDD 20 as the installation destination of the operating system 122. As a result, for example, no floppy disk (R) drive need be equipped, and the cost can be reduced.

In addition, since the physical access driver 113 is used, the user need not execute input for various kinds of setup in two steps, i.e., before and after initialization of the HDD 20 even when, e.g., the floppy disk (R) drive is omitted. That is, all input operations for various kinds of configuration setup can be ended at once at the start, as required by the user.

Furthermore, after initialization of the HDDs 20, the setting parameters are converted into a file format accessible under the operating system 122. For this reason, for example, a verification operation of referring to the setting parameters can also easily be executed.

The above-described embodiment has been described assuming that the physical access driver 113 accesses the HDDs 20 of predetermined type. When, various kinds of HDDs 20 including, e.g., IDE, SCSI, and SCSI-RAID are used, and one of the HDDs can arbitrarily be selected as the installation destination of the operating system 122, a parameter representing the HDD type may be exchanged between the physical access driver 113 and the setup support utility 112. The physical access driver 113 may give the received parameter to the physical access routine 101.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A setup support system which supports setup of a computer, including installation of an operating system to be installed in a plurality of storage mediums where a RAID configuration is to be constructed, comprising:
   a physical access unit configured to execute physical access to the storage mediums without intervening the operating system;
   an interface unit configured to execute input operations for configuration setup of the computer, including construction of the RAID configuration, at once;
   a setting parameter management unit configured to store setting parameters representing input setting contents in at least one of the storage mediums before the construction of the RAID configuration by using the physical access unit;
   a medium setting unit configured to construct the RAID configuration while accessing the setting parameters stored in the at least one of the storage mediums by using the physical access unit; and
   a setup unit configured to execute setup of the computer after the construction of the RAID configuration, including generation of a disk partition in each of the storage mediums where the RAID configuration is constructed and installation of the operating system, while accessing the setting parameters stored in the at least one of the storage mediums by using the physical access unit, wherein:

the setup unit converts the setting parameters read out by using the physical access unit into a data format under management of the operating system and stores the setting parameters again in the storage mediums, and the setup unit stores status data representing a progress situation of the generation of the disk partition in each of the storage mediums where the RAID configuration is constructed and the installation of the operating system in the storage mediums in a data format under management of the operating system and reads out the status data from the storage mediums as needed.

* * * * *